(12) United States Patent
Guo et al.

(10) Patent No.: US 8,541,505 B2
(45) Date of Patent: *Sep. 24, 2013

(54) POLY(ARYLENE ETHER) COMPOSITION WITH IMPROVED MELT FLOW AND METHOD FOR THE PREPARATION THEREOF

(75) Inventors: Hua Guo, Selkirk, NY (US); Michael L. Todt, Rexford, NY (US); John Yates, Glenmont, NY (US)

(73) Assignee: Sabic Innovative Plastics IP B.V. (NL)

( * ) Notice: Subject to any disclaimer, the term of this patent is extended or adjusted under 35 U.S.C. 154(b) by 194 days.

This patent is subject to a terminal disclaimer.

(21) Appl. No.: 13/057,480

(22) PCT Filed: Sep. 21, 2009

(86) PCT No.: PCT/US2009/057612
§ 371 (c)(1),
(2), (4) Date: Feb. 4, 2011

(87) PCT Pub. No.: WO2010/039470
PCT Pub. Date: Apr. 8, 2010

(65) Prior Publication Data
US 2011/0184128 A1    Jul. 28, 2011

Related U.S. Application Data

(60) Provisional application No. 61/101,206, filed on Sep. 30, 2008, provisional application No. 61/146,450, filed on Jan. 22, 2009, provisional application No. 61/224,936, filed on Jul. 13, 2009.

(30) Foreign Application Priority Data

Apr. 27, 2009  (EP) ..................................... 09158825
Jul. 21, 2009  (CN) ......................... 2009 1 0158213

(51) Int. Cl.
| | |
|---|---|
| C08F 8/06 | (2006.01) |
| C08F 8/32 | (2006.01) |
| C08F 8/42 | (2006.01) |
| C08L 71/12 | (2006.01) |
| C08G 65/44 | (2006.01) |
| C08G 65/46 | (2006.01) |
| C08G 65/48 | (2006.01) |

(52) U.S. Cl.
USPC ........... 525/132; 525/392; 525/391; 525/397; 525/390

(58) Field of Classification Search
USPC .......................... 525/132, 392, 391, 397, 390
See application file for complete search history.

(56) References Cited

U.S. PATENT DOCUMENTS

| | | |
|---|---|---|
| 2,071,250 A | 2/1937 | Carothers |
| 2,130,523 A | 9/1938 | Carothers |

(Continued)

FOREIGN PATENT DOCUMENTS

| | | |
|---|---|---|
| EP | 0799857 A2 | 10/1997 |
| EP | 2169007 A1 | 4/2009 |

(Continued)

OTHER PUBLICATIONS

Machine translation of JP 2007238865 A Nov. 29, 2012.*

(Continued)

*Primary Examiner* — Mike M Dollinger
(74) *Attorney, Agent, or Firm* — Cantor Colburn LLP

(57) ABSTRACT

A thermoplastic composition is prepared by melt blending a poly(arylene ether) and an other resin, where the poly(arylene ether) has a particular molecular weight distribution. The thermoplastic composition exhibits significantly increased melt flow compared to compositions containing poly(arylene ether)s with similar intrinsic viscosities but different molecular weight distributions. The increased melt flow facilitates preparation of the thermoplastic composition and subsequent article fabrication procedures.

29 Claims, 1 Drawing Sheet

(56) References Cited

U.S. PATENT DOCUMENTS

| | | | |
|---|---|---|---|
| 2,130,948 | A | 9/1938 | Carothers |
| 2,241,322 | A | 5/1941 | Hanford |
| 2,312,966 | A | 3/1943 | Hanford |
| 2,465,319 | A | 3/1949 | Whinfield et al. |
| 2,512,606 | A | 6/1950 | Bolton et al. |
| 2,720,502 | A | 10/1955 | Caldwell |
| 2,727,881 | A | 12/1955 | Caldwell et al. |
| 2,822,348 | A | 2/1958 | Haslam |
| 3,047,539 | A | 7/1962 | Pengilly |
| 3,354,129 | A | 11/1967 | Edmonds et al. |
| 3,671,487 | A | 6/1972 | Abolins |
| 3,919,177 | A | 11/1975 | Campbell |
| 3,953,394 | A | 4/1976 | Fox et al. |
| 4,128,526 | A | 12/1978 | Borman |
| 4,440,923 | A | 4/1984 | Bartmann et al. |
| 4,537,948 | A | 8/1985 | Bartmann et al. |
| 4,664,972 | A | 5/1987 | Connolly |
| 4,769,424 | A | 9/1988 | Takekoshi et al. |
| 4,794,164 | A | 12/1988 | Iwasaki et al. |
| 4,978,715 | A * | 12/1990 | Brown et al. ............... 525/92 D |
| 5,110,896 | A | 5/1992 | Waggoner et al. |
| 5,258,455 | A * | 11/1993 | Laughner et al. ............... 525/68 |
| H001387 | H * | 12/1994 | Hansen et al. ............... 525/92 D |
| 6,025,419 | A | 2/2000 | Kasowski et al. |
| 6,096,821 | A * | 8/2000 | Adedeji et al. ............... 524/508 |
| 6,124,421 | A * | 9/2000 | Lau et al. ............... 528/169 |
| 6,339,131 | B1 | 1/2002 | Cella et al. |
| 6,407,200 | B1 | 6/2002 | Singh et al. |
| 6,444,779 | B1 | 9/2002 | Singh et al. |
| 7,019,062 | B2 | 3/2006 | van Beek et al. |
| 2008/0113138 | A1 | 5/2008 | Pecak et al. |
| 2008/0312371 | A1 | 12/2008 | Todt et al. |
| 2011/0003962 | A1 | 1/2011 | Carrillo et al. |

FOREIGN PATENT DOCUMENTS

| | | | |
|---|---|---|---|
| GB | 1430615 A | | 3/1976 |
| JP | 2007238865 A | * | 9/2007 |
| WO | 9808898 A1 | | 3/1998 |
| WO | 03078526 A1 | | 9/2003 |
| WO | 2005/105921 A1 | | 11/2005 |

OTHER PUBLICATIONS

Screenshot Bluestar website organic chemicals Oct. 2007.*
ASTM D1238-04c, Standard Test Method for Melt Flow Rates of Thermoplastics by Extrusion Plastometer, Published: Dec. 2004, 14 pages.
ASTM D256-06, Standard Test Method for Determining the Izod Pendulum Impact Resistance of Plastics, Published: Dec. 2006, 20 pages.
ASTM D 638-03, Standard Test Method for Tensile Properties of Plastics, Published: Jan. 2004, 15 pages.
ASTM D648-07, Standard Test Method for Deflection Temperature of Plastics Under Flexural Load in the Edgewise Position, Published: Mar. 2007, 13 pages.
ASTM D 790-07, Standard Test Methods for Flexural Properties of Unreinforced and Reinforced Plastics and Electrical Insulating Materials, Published: Oct. 2007, 11 pages.
European Search Report for European Application No. 09818235.5, European Filing Date Sep. 21, 2009, Date of Report May 31, 2012, 6 pages.
CS 175296 English Translation, Published: Aug. 20, 1976, 4 pages.
CS 175309 English Translation, Published: Aug. 20, 1976.
CS 185025 English Tranlsation, Published: Dec. 30, 1977, 3 pages.
CS 187008 English Translation, Published: Apr. 28, 1978, 3 pages.
CS 226924 English Translation, Published: Jun. 24, 1983, 4 pages.
CS 227586 English Translation, Published: Nov. 12, 1982, 3 pages.
CS 229840 English Translation, Published: Dec. 13, 1982, 3 pages.
CS 256661 English Translation, Published: Jan. 16, 1989, 3 pages.
CS 275438 English Translation, Published: Apr. 11, 1991.
CS 275981 English Translation, Published: Jul. 16, 1991, 4 pages.
CS 298883 English Translation, Published: Dec. 15, 2004, 9 pages.
European Patent Office, Application No. 10167965.2-2101, Dated: Nov. 17, 2010, 5 pages.
JP4059870 A; Feb. 26, 1991; Abstract Only (1 page).
Written Opinion of the International Searching Authority; International Application No. PCT/US2009/057612; International Filing Date Sep. 21, 2009; 6 pages.
China Polyphenylene ether polyphenylene ether suppliers and manufacturers, Webpage, Downloaded Jul. 30, 2009, 1 page.
CN101230191A; Publication Date Jul. 30, 2008; 8 pages.

* cited by examiner

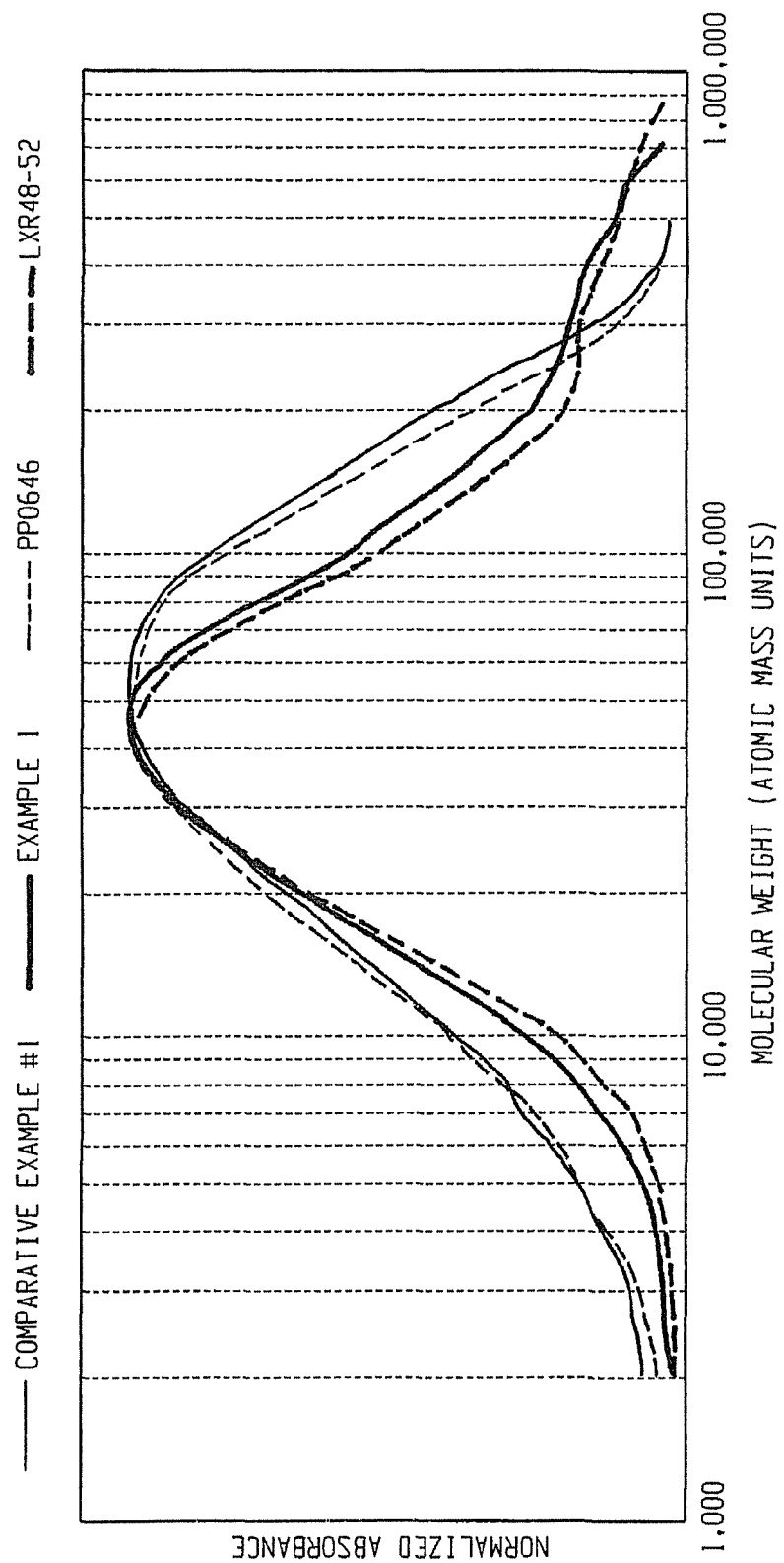

US 8,541,505 B2

POLY(ARYLENE ETHER) COMPOSITION WITH IMPROVED MELT FLOW AND METHOD FOR THE PREPARATION THEREOF

CROSS REFERENCE TO RELATED APPLICATIONS

This is a U.S. national stage of application No. PCT/US2009/057612, filed on 21 Sep. 2009, which claims priority to U.S. Provisional Application Ser. No. 61/101,206, filed 30 Sep. 2008, and U.S. Provisional Application Ser. No. 61/146,450, filed 22 Jan. 2009, and European Patent Application No. 09158825.1, filed 27 Apr. 2009, and U.S. Provisional Application Ser. No. 61/224,936, filed 13 Jul. 2009, and Chinese Patent Application No. 200910158213.6, filed 21 Jul. 2009. The disclosures of the related applications are incorporated herein by reference.

BACKGROUND OF THE INVENTION

Poly(arylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(arylene ether)s with various other plastics in order to meet the requirements of a wide variety of consumer products, for example, plumbing fixtures, electrical boxes, automotive parts, and insulation for wire and cable.

Compared with other thermoplastic resins, poly(arylene ether)s have relatively high glass transition temperatures. As a result, relatively high temperatures are required to process thermoplastic compositions incorporating poly(arylene ether)s. Specifically, high temperatures are required to blend poly(arylene ether)s with other resins and to fabricate articles from the resulting blends. There is therefore a desire for poly(arylene ether)-containing compositions that would allow lower temperature processing without substantially impairing physical properties of the resulting blends.

BRIEF DESCRIPTION OF THE INVENTION

One embodiment is a method of increasing the melt flow rate of a poly(arylene ether)-containing thermoplastic composition, comprising: melt blending
  a poly(arylene ether) characterized by a weight average molecular weight and a peak molecular weight, wherein a ratio of the weight average molecular weight to the peak molecular weight is about 1.3:1 to about 4:1, and
  an other polymer selected from the group consisting of styrenic polymers, polyamides, polyolefins, poly(phenylene sulfide)s, and mixtures thereof
to form a thermoplastic composition.

Another embodiment is a thermoplastic composition, comprising: a poly(arylene ether) characterized by a weight average molecular weight and a peak molecular weight, wherein a ratio of the weight average molecular weight to the peak molecular weight is about 1.3:1 to about 4:1; and an other polymer selected from the group consisting of styrenic polymers, polyamides, polyolefins, poly(phenylene sulfide)s, and mixtures thereof.

Another embodiment is a method of preparing a thermoplastic composition, comprising melt blending
  a poly(arylene ether) characterized by a weight average molecular weight and a peak molecular weight, wherein a ratio of the weight average molecular weight to the peak molecular weight is about 1.3:1 to about 4:1, and
  an other polymer selected from the group consisting of styrenic polymers, polyamides, polyolefins, poly(phenylene sulfide)s, and mixtures thereof
to form a thermoplastic composition.

These and other embodiments are described in detail below.

BRIEF DESCRIPTION OF THE FIGURE

The FIGURE shows molecular weight distribution curves for a poly(2,6-dimethyl-1,4-phenylene ether) having a ratio of weight average molecular weight to peak molecular weight of 1.25:1 (dots), a poly(2,6-dimethyl-1,4-phenylene ether) having a ratio of weight average molecular weight to peak molecular weight of 2.07:1 (bold dashes), the poly(2,6-dimethyl-1,4-phenylene ether) component of a poly(arylene ether)/rubber-modified polystyrene blend prepared using a poly(2,6-dimethyl-1,4-phenylene ether) having a ratio of weight average molecular weight to peak molecular weight of 1.25:1 (solid curve), and the poly(2,6-dimethyl-1,4-phenylene ether) component of a poly(arylene ether)/rubber-modified polystyrene blend prepared using a poly(2,6-dimethyl-1,4-phenylene ether) having a ratio of weight average molecular weight to peak molecular weight of 2.07:1 (dashed curve).

DETAILED DESCRIPTION OF THE INVENTION

Poly(arylene ether)s are prepared commercially by oxidative polymerization methods that produce poly(arylene ether) molecules with a variety of molecular weights. The molecular weight distribution of a poly(arylene ether) is typically characterized by one or more of three properties: number average molecular weight, weight average molecular weight, and intrinsic viscosity. Among these, weight average molecular weight and intrinsic viscosity are often considered more predictive of physical properties than number average molecular weight. The present inventors have observed that the melt flow properties of poly(arylene ether)-containing compositions can vary significantly when one poly(arylene ether) is substituted for another prepared from the same monomer(s) and having the same or similar intrinsic viscosity and/or weight average molecular weight. This can make it difficult to control the ultimate physical properties of blends of the poly (arylene ether) with other resins. The present inventors have discovered that melt flow properties can be related to a particular molecular weight property not heretofore utilized by blend formulators. Specifically, the present inventors have discovered that increases (improvements) in melt flow can be obtained when the poly(arylene ether) has a ratio of weight average molecular weight to peak molecular weight in a particular range, where peak molecular weight is defined below. These increases in melt flow can be utilized in a variety of ways, including the preparation of poly(arylene ether)-containing compositions at reduced temperatures, the use of reduced processing temperatures to mold articles from poly (arylene ether)-containing compositions, and the molding of more intricate articles at a given processing temperature. These advantages are often obtained without a substantial sacrifice in other properties of the poly(arylene ether)-containing compositions.

Thus, one embodiment is a method of increasing the melt flow rate of a poly(arylene ether)-containing thermoplastic composition, comprising: melt blending a poly(arylene ether) characterized by a weight average molecular weight and a peak molecular weight, wherein a ratio of the weight average molecular weight to the peak molecular weight is about 1.3:1 to about 4:1, and an other polymer selected from the group consisting of styrenic polymers, polyamides, polyolefins, poly(phenylene sulfide)s, and mixtures thereof to form a thermoplastic composition. As described in the working examples below, the poly(arylene ether) molecular weight distribution is typically analyzed in the molecular weight range from 250 to 1,000,000 atomic mass units.

As used herein, the term "peak molecular weight" is defined as the most commonly occurring molecular weight in the molecular weight distribution. In statistical terms, the peak molecular weight is the mode of the molecular weight distribution. In practical terms, when the molecular weight is determined by a chromatographic method such as gel permeation chromatography, the peak molecular weight is the poly(arylene ether) molecular weight of the highest point in a plot of molecular weight on the x-axis versus absorbance on the y-axis. A detailed procedure for determining a molecular weight distribution using gel permeation chromatography is presented in the working examples.

The poly(arylene ether) has a ratio of weight average molecular weight to peak molecular weight of about 1.3:1 to about 4:1. Within this range, the ratio can be about 1.5:1 to about 3:1, specifically about 1.5:1 to about 2.5:1, more specifically about 1.6:1 to about 2.3:1, still more specifically 1.7:1 to about 2.1:1.

As noted above, the thermoplastic composition can exhibit improved melt flow compared to thermoplastic compositions prepared from poly(arylene ether)s not having the specified molecular weight properties. Thus, in some embodiments, particularly embodiments in which the thermoplastic composition comprises at least 20 weight percent of the poly(arylene ether) based on the total weight of the thermoplastic composition, the thermoplastic composition exhibits a melt flow rate value, measured according to ASTM D1238-04c at 280° C. and 5 kilogram load, that is at least 10 percent greater than the melt flow rate value of a corresponding thermoplastic composition prepared with a poly(arylene ether) having a ratio of weight average molecular weight to peak molecular weight of 1.0 to 1.25. In some embodiments, the improvement in melt flow rate is 10 to about 150 percent, specifically about 20 to about 140 percent, more specifically about 40 to about 130 percent, still more specifically about 60 to about 120 percent, yet more specifically about 80 to about 110 percent.

The thermoplastic compositions also make it possible to improve melt flow properties while substantially maintaining or even improving physical properties of articles molded from the thermoplastic compositions. At least one physical property can be maintained or improved. Thus, in some embodiments, including embodiments in which the thermoplastic composition comprises at least 20 weight percent of the poly(arylene ether) based on the total weight of the thermoplastic composition, the thermoplastic composition exhibits a value of at least one of the following properties that is degraded by no more than 5% or unchanged or improved relative to a corresponding property value of a corresponding thermoplastic composition prepared with a poly(arylene ether) having a ratio of weight average molecular weight to peak molecular weight of 1.0:1 to 1.25:1: tensile strength at yield, measured at 23° C. according to ASTM D638-03, tensile elongation at break, measured at 23° C. according to ASTM D638-03, tensile modulus, measured at 23° C. according to ASTM D638-03, flexural strength, measured at 23° C. according to ASTM D790-07, flexural modulus, measured at 23° C. according to ASTM D790-07, notched Izod impact strength, measured at 23° C. according to ASTM D256-06, notched Izod impact strength, measured at −30° C. according to ASTM D256-06, unnotched Izod impact strength, measured at 23° C. according to ASTM D256-06, and heat distortion temperature, measured according to ASTM D648-07 using a sample thickness of 6.4 millimeters and a load of 1.82 megapascals.

A range of physical properties can be maintained or improved. Thus, in some embodiments, including embodiments in which the thermoplastic composition comprises at least 20 weight percent of the poly(arylene ether) based on the total weight of the thermoplastic composition, the thermoplastic composition exhibits values of at least one tensile property and at least one flexural property and at least one impact strength property and one heat resistance property that are degraded by no more than 5% or unchanged or improved relative to corresponding property values of a corresponding thermoplastic composition prepared with a poly(arylene ether) having a ratio of weight average molecular weight to peak molecular weight of 1.0 to 1.25. The at least one tensile property can be tensile strength at yield measured at 23° C. according to ASTM D638-03, tensile elongation at break measured at 23° C. according to ASTM D638-03, or tensile modulus measured at 23° C. according to ASTM D638-03. The at least one flexural property can be flexural strength, measured at 23° C. according to ASTM D790-07, or flexural modulus, measured at 23° C. according to ASTM D790-07. The at least one impact strength property can be notched Izod impact strength measured at 23° C. according to ASTM D256-06, notched Izod impact strength measured at −30° C. according to ASTM D256-06, or unnotched Izod impact strength measured at 23° C. according to ASTM D256-06. The heat resistance property can be a heat distortion temperature measured according to ASTM D648-07 using a sample thickness of 6.4 millimeters and a load of 1.82 megapascals.

The thermoplastic composition comprises a poly(arylene ether). As used herein, the term "poly(arylene ether)" refers to a polymer comprising repeating structural units having the formula

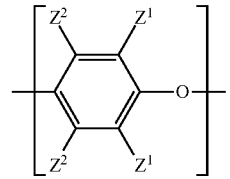

wherein for each structural unit, each $Z^1$ is independently halogen, unsubstituted or substituted $C_1$-$C_{12}$, hydrocarbyl with the proviso that the hydrocarbyl group is not tertiary hydrocarbyl, $C_1$-$C_{12}$ hydrocarbylthio (that is, ($C_1$-$C_{12}$ hydrocarbyl)S—), $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties.

In some embodiments, the poly(arylene ether) comprises 2,6-dimethyl-1,4-phenylene ether units, 2,3,6-trimethyl-1,4-phenylene ether units, or a combination thereof.

The poly(arylene ether) can comprise tetramethyldiphenoquinone (TMDQ) end groups, typically obtained from 2,6-dimethylphenol-containing reaction mixtures in which tetramethyldiphenoquinone by-product is present. The poly (arylene ether) can be in the form of a homopolymer, a copolymer, a graft copolymer, an ionomer, or a block copolymer, as well as combinations comprising at least one of the foregoing.

In some embodiments, the poly(arylene ether) has an intrinsic viscosity of 0.05 to 1.0 deciliter per gram (dL/g), as measured in chloroform at 25° C., specifically 0.1 to 0.8 dL/g, more specifically 0.2 to 0.6 dL/g, even more specifically 0.3 to 0.6 dL/g. In some embodiments, the poly(arylene ether) has a weight average molecular weight of about 30,000 to about 120,000 atomic mass units, specifically about 40,000 to about 100,000 atomic mass units, more specifically about 50,000 to about 90,000 atomic mass units. In some embodiments, the poly(arylene ether) has a peak average molecular weight of about 15,000 to about 80,000 atomic mass units, specifically about 20,000 to about 70,000 atomic mass units, more specifically about 25,000 to about 60,000 atomic mass units.

The molecular weight distribution of the poly(arylene ether) can have a molecular weight distribution that is monomodal, bimodal, or polymodal. The modality of the poly (arylene ether) molecular weight distributions is typically analyzed in the range 250 to 1,000,000 atomic mass units. The terms "monomodal", "bimodal", and "polymodal" refer to the number of local maxima in a plot of molecular weight on the x-axis versus frequency on the y-axis. As a practical matter, the plot can be a gel permeation chromatogram with absorbance on the y-axis. Thus, a monomodal molecular weight distribution has one local maximum, a bimodal molecular weight distribution has two local maxima, and a polymodal molecular weight distribution has three or more local maxima. The term "at least bimodal" means that the plot has two or more local maxima.

When the poly(arylene ether) molecular weight distribution is at least bimodal, the two or more local maxima can be separated by a characteristic molecular weight multiplier. Thus, in some embodiments, the molecular weight distribution comprises a first local maximum having a first molecular weight (corresponding to the peak molecular weight, $M_p$) and a second local maximum having a second molecular weight that is greater than the first molecular weight, and the ratio of the second molecular weight to the first molecular weight is about 2:1 to about 4:1.

In a very specific embodiment, the poly(arylene ether) is a poly(2,6-dimethyl-1,4-phenylene ether), which, before it is blended with the other resin, has a weight average molecular weight of about 75,000 to about 95,000 atomic mass units, a peak molecular weight of about 40,000 to about 60,000 atomic mass unit, a ratio of the weight average molecular weight to the peak molecular weight is about 1.6:1 to about 2.3:1, and a bimodal molecular weight distribution comprising a second local maximum having a second molecular weight of about 200,000 to about 400,000 atomic mass units. Within the range of about 75,000 to about 95,000 atomic mass units, the weight average molecular weight can be about 80,000 to about 90,000 atomic mass units. Within the range of about 40,000 to about 60,000 atomic mass units, the peak molecular weight can be about 45,000 to about 55,000 atomic mass units. Within the range of about 1.6:1 to about 2.3:1, the ratio of weight average molecular weight to peak molecular weight can be about 1.6:1 to about 2:1, specifically about 1.6:1 to about 1.8:1. The poly(2,6-dimethyl-1,4-phenylene ether) can have these same molecular weight characteristics after it is blended with the other resin. In other words, the molecular weight characteristics of the poly(2,6-dimethyl-1, 4-phenylene ether) can change very little on compounding with the other resin. Whether analyzed before or after compounding with the other resin, the poly(2,6-dimethyl-1,4-phenylene ether) can comprise 10 to 20 weight percent, specifically 12 to 18 weight percent, of molecules having a molecular weight greater than 500,000 atomic mass units.

In another very specific embodiment, the poly(arylene ether) is a poly(2,6-dimethyl-1,4-phenylene ether), which, before it is blended with the other resin, has a weight average molecular weight of about 50,000 to about 70,000 atomic mass units, a peak molecular weight of about 25,000 to about 35,000 atomic mass unit, a ratio of the weight average molecular weight to the peak molecular weight is about 1.6:1 to about 2.3:1, and a bimodal molecular weight distribution comprising a second local maximum having a second molecular weight of about 200,000 to about 500,000 atomic mass units. Within the range of about 50,000 to about 70,000 atomic mass units, the weight average molecular weight can be about 55,000 to about 66,000 atomic mass units. Within the range of about 25,000 to about 35,000 atomic mass units, the peak molecular weight can be about 27,000 to about 33,000 atomic mass units. Within the range of about 1.6:1 to about 2.3:1, the ratio of weight average molecular weight to peak molecular weight can be about 1.8:1 to about 2.3:1, specifically about 1.9:1 to about 2.2:1. The poly(2,6-dimethyl-1,4-phenylene ether) can have these same molecular weight characteristics after it is blended with the other resin. In other words, the molecular weight characteristics of the poly(2,6-dimethyl-1,4-phenylene ether) can change very little on compounding with the other resin. Whether analyzed before or after compounding with the other resin, the poly(2, 6-dimethyl-1,4-phenylene ether) can comprise 15 to 25 weight percent, specifically 17 to 21 weight percent, of molecules having a molecular weight greater than 500,000 atomic mass units.

In another very specific embodiment, the poly(arylene ether) is a poly(2,6-dimethyl-1,4-phenylene ether), which, before it is blended with the other resin, has a weight average molecular weight of about 40,000 to about 60,000 atomic mass units, a peak molecular weight of about 25,000 to about 35,000 atomic mass unit, a ratio of the weight average molecular weight to the peak molecular weight is about 1.6:1 to about 2.3:1, and a bimodal molecular weight distribution comprising a second local maximum having a second molecular weight of about 200,000 to about 400,000 atomic mass units. Within the range of about 40,000 to about 60,000 atomic mass units, the weight average molecular weight can be about 45,000 to about 56,000 atomic mass units. Within the range of about 25,000 to about 35,000 atomic mass units, the peak molecular weight can be about 27,000 to about 33,000 atomic mass units. Within the range of about 1.6:1 to about 2.3:1, the ratio of weight average molecular weight to peak molecular weight can be about 1.6:1 to about 2:1, specifically about 1.6:1 to about 1.9:1. The poly(2,6-dimethyl-1, 4-phenylene ether) can have these same molecular weight characteristics after it is blended with the other resin. In other words, the molecular weight characteristics of the poly(2,6-dimethyl-1,4-phenylene ether) can change very little on compounding with the other resin. Whether analyzed before or after compounding with the other resin, the poly(2,6-dimethyl-1,4-phenylene ether) can comprise 5 to 15 weight percent, specifically 7 to 13 weight percent, of molecules having a molecular weight greater than 500,000 atomic mass units.

Poly(arylene ether)s having the specified molecular weight characteristics can be prepared by a so-called "reactive precipitation" procedure using specific catalysts. In reactive precipitation, oxidative polymerization is conducted in a mixture comprising a solvent for the poly(arylene ether) and a non-solvent for the poly(arylene ether), and the product poly(arylene ether) precipitates out of the polymerization reaction mixture. Suitable solvents for the poly(arylene ether) include aromatic hydrocarbons such as benzene, alkyl-substituted benzenes (including toluene and xylenes), and mixtures thereof. Suitable non-solvents for the poly(arylene ether) include $C_1$-$C_4$ alkanols (such as methanol, ethanol, n-propanol, isopropanol, and butanols), $C_3$-$C_{12}$ ketones (such as acetone, methyl ethyl ketone, and acetophenone), $C_3$-$C_{12}$ aliphatic esters (such as methyl acetate, ethyl acetate, butyl acetate, and caprolactone), $C_3$-$C_{12}$ aliphatic amides (such as dimethylformamide, dimethylacetamide, and caprolactam), and mixtures thereof. The weight ratio of solvent to non-solvent is typically in the range of about 1:10 to about 10:1, specifically about 1:5 to about 5:1, more specifically about 1:3 to about 3:1, yet more specifically about 1:2 to about 2:1. The specific catalyst comprises copper ion and morpholine. The copper ion is typically provide in the form of a copper halide salt, such as a cuprous ($Cu^+$) or cupric ($Cu^{2+}$) salt of chloride, bromide, or iodide. Preferred copper salts include cuprous chloride and cupric chloride. In some embodiments, the molar ratio of copper ion to morpholine is about 10:1 to about 100:1, specifically about 20:1 to about 70:1. In addition to morpholine, the catalyst can, optionally, further comprise other amines, including dialkylamines (such as dicyclohexylamine), trialkylamines (such as triethylamine), aromatic amines (such as pyridine), and mixtures thereof. Detailed reaction conditions for reactive precipitation in the presence of copper/morpholine catalysts are described in, for example, Czechoslovakia Specification of Invention Nos. 227,586 and 229,840 of Bartaskova et al., and Czechoslovakia Patent Specification Nos. 275,438 and 275,981 of Spousta et al. Use of a catalyst comprising morpholine can be detected by residual morpholino groups in the product poly(arylene ether). Thus, in some embodiments, the poly(arylene ether) comprises about 0.1 to about 0.6 weight percent of (covalently bound) morpholino groups, based on the weight of the poly(arylene ether). Within this range, the concentration of morpholino groups can be about 0.15 to about 0.5 weight percent, specifically about 0.2 to about 0.4 weight percent. The content of (covalently bound) morpholino groups in the poly(arylene ether) can be determined by proton nuclear magnetic resonance spectroscopy ($^1$H NMR), as described in with working examples below.

There is no particular limitation on the physical form of the poly(arylene ether) that is melt blended with the other resin. For example, the poly(arylene ether) can be provided in the form of a powder directly obtained from polymerization followed by precipitation. As another example, the poly(arylene ether) can be provided as a compacted powder formed by compacting a precipitated powder at a temperature less than the melting temperature of the poly(arylene ether), specifically less than the glass transition temperature of the poly(arylene ether). See, for example, International Publication No. WO 2005/105921 A1 of Guo et al. As another example, the poly(arylene ether) can be provided in the form of pellets created by melt extrusion and pelletization of a precipitated powder, or by devolatilizing extrusion of a poly(arylene ether) solution. See, for example, U.S. Pat. No. 6,096,821 to Adedeji et al.

The poly(arylene ether) used in the present thermoplastic compositions is distinguished from commercially available poly(arylene ether)s prepared using a catalyst comprising di-n-butylamine. Thus, in some embodiments, the poly(arylene ether) is substantially free of di-n-butylamino groups (that is, it comprises less than or equal to 0.01 weight percent di-n-butylamino groups, preferably less than or equal to 0.005 weight percent di-n-butylamino groups). The content of (covalently bound) di-n-butylamino groups in the poly(arylene ether) can be determined by $^1$H NMR.

The thermoplastic composition can comprise the poly(arylene ether) in an amount of about 5 to about 95 weight percent, based on the total weight of the composition. Within this range, the poly(arylene ether) amount can be about 10 to about 90 weight percent, specifically about 20 to about 80 weight percent, more specifically about 20 to about 70 weight percent, even more specifically about 30 to about 60 weight percent, yet more specifically about 40 to about 60 weight percent. The melt flow benefits of the thermoplastic composition are most pronounced when the poly(arylene ether) amount is at least 20 weight percent.

In addition to the poly(arylene ether), the thermoplastic composition comprises an other polymer. Suitable other polymers include styrenic polymers, polyamides, polyolefins, poly(phenylene sulfide)s, and mixtures thereof.

The thermoplastic composition can comprise the other resin in an amount of about 5 to about 95 weight percent, based on the total weight of the composition. Within this range, other resin amount can be about 10 to about 90 weight percent, specifically about 20 to about 80 weight percent, more specifically about 30 to about 70 weight percent, even more specifically about 40 to about 60 weight percent.

The other resin can be a styrenic polymer. In general, the styrenic polymer is a polymer comprising at least 10 weight percent of units derived from polymerization of styrene or another alkenyl aromatic monomer represented by the structure

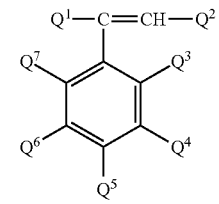

wherein $Q^1$ and $Q^2$ each independently represent a hydrogen atom, a $C_1$-$C_8$ alkyl group, or a $C_2$-$C_8$ alkenyl group; $Q^3$ and $Q^7$ each independently represent a hydrogen atom, or a $C_1$-$C_8$ alkyl group; and $Q^4$, $Q^5$, and $Q^6$ each independently represent a hydrogen atom, a $C_1$-$C_8$ alkyl group, or a $C_2$-$C_8$ alkenyl group, or $Q^3$ and $Q^4$ are taken together with the central aromatic ring to form a naphthyl group, or $Q^4$ and $Q^5$ are taken together with the central aromatic ring to form a naphthyl group. Specific alkenyl aromatic monomers include, for example, styrene, methylstyrenes such as alpha-methylstyrene and p-methylstyrene, and p-t-butylstyrene.

Particular classes of styrenic polymers include, for example, homopolystyrenes, rubber-modified polystyrenes, unhydrogenated block copolymers of an alkenyl aromatic monomer and a conjugated diene, hydrogenated block copolymers of an alkenyl aromatic monomer and a conjugated diene, and the like, and mixtures thereof.

In some embodiments, the styrenic polymer comprises a homopolystyrene, specifically a polystyrene having a weight average molecular weight of about 20,000 to about 300,000 atomic mass units. The polystyrene can be an atactic polystyrene or a syndiotactic polystyrene.

In some embodiments, the styrenic polymer comprises a rubber-modified polystyrene (also sometimes referred to as a high-impact polystyrene or HIPS). Suitable rubber modified polystyrenes include those having a total weight average molecular weight of about 20,000 to about 300,000 atomic mass units; about 80 to about 95 weight percent polystyrene and about 5 to about 20 weight percent polybutadiene; and a polybutadiene particle size of about 0.1 to about 30 micrometers.

In some embodiments, the styrenic polymer comprises an unhydrogenated block copolymer of an alkenyl aromatic monomer and a conjugated diene, a (partially or fully) hydrogenated block copolymer of an alkenyl aromatic monomer and a conjugated diene, or a mixture thereof. Illustrative unhydrogenated block copolymers are polystyrene-polybutadiene diblock copolymers (SB), polystyrene-polybutadiene-polystyrene triblock copolymers (SBS), and polystyrene-polyisoprene-polystyrene triblock copolymers (SIS). Illustrative hydrogenated block copolymers are polystyrene-poly(ethylene-propylene) diblock copolymer (SEP), polystyrene-poly(ethylene-butylene)-polystyrene (SEBS), and polystyrene-poly(butadiene-butylene)-polystyrene triblock copolymer (also known as SBBS, or partially hydrogenated polystyrene-polybutadiene-polystyrene triblock copolymer). The block polymer can comprise at least one block having a random or controlled distribution of styrene and butadiene. Such styrenic polymers include those sold under the trade names KRATON A-RP6936 and KRATON A-RP6935 by Kraton Polymers, and L601 by Asahi Kasei. In some embodiments, the styrenic polymer comprises a polystyrene-poly(ethylene-butylene)-polystyrene triblock copolymer. In some embodiments, the styrenic polymer comprises a polystyrene-poly(ethylene-butylene)-polystyrene triblock copolymer comprising about 10 to about 70 weight percent polystyrene, based on the weight of the triblock copolymer. In some embodiments, the styrenic polymer comprises a radial block copolymer of an alkenyl aromatic monomer and a conjugated diene; wherein the radial block copolymer has 50 to about 75 weight percent of repeating units derived from the alkenyl aromatic monomer; and wherein the radial block copolymer has a number average molecular weight less than or equal to 70,000 atomic mass units.

Combinations of two or more different styrenic polymers can be used. Thus, in some embodiments, the styrenic polymer comprises a homopolystyrene and a rubber-modified polystyrene. In some embodiments, the styrenic polymer comprises a homopolystyrene in combination with an unhydrogenated block copolymer of an alkenyl aromatic monomer and a conjugated diene, a hydrogenated block copolymer of an alkenyl aromatic monomer, or a mixture thereof.

Methods of producing styrenic polymers are known in the art, and a wide variety of styrenic polymers is commercially available.

The other resin can be a polyamide. The polyamide resins are a generic family of resins, also known as nylons, characterized by the presence of recurring amide (—C(O)NH—) units in the main polymer chain. In some embodiments, the polyamide is a polyamide-6 and/or a polyamide-6,6. Other polyamides, such as polyamide-4, polyamide-4,6, polyamide-12, polyamide-6,10, polyamide-6,9, polyamide-6,12, polyamide-ST, copolymers of polyamide-6,6 and polyamide-6, and others such as the amorphous polyamides, are also useful. Mixtures of various polyamides, as well as various polyamide copolymers, are also useful. Methods of preparing polyamides are known in the art.

The polyamides can be obtained by a number of well-known processes such as those described in U.S. Pat. Nos. 2,071,250; 2,071,251; 2,130,523; 2,130,948; 2,241,322; 2,312,966; and 2,512,606. Polyamide-6, for example, is a polymerization product of caprolactam. Polyamide-6,6 is a condensation product of adipic acid and 1,6-diaminohexane. Likewise, polyamide-4,6 is a condensation product between adipic acid and 1,4-diaminobutane. Besides adipic acid, other useful diacids for the preparation of polyamides include azelaic acid, sebacic acid, dodecane diacid, as well as terephthalic and isophthalic acids, and the like. Other useful diamines include m-xylene diamine, di-(4-aminophenyl)methane, di-(4-aminocyclohexyl)methane; 2,2-di-(4 aminophenyl)propane, 2,2-di-(4-aminocyclohexyl)propane, among others. Copolymers of caprolactam with diacids and diamines are also useful.

It is also to be understood that the use of the term "polyamides" herein is intended to include the toughened or super tough polyamides. Super tough polyamides, or super tough nylons as commonly known, are commercially available as, for example, available from E.I. duPont under the trade name ZYTEL ST, and methods for their preparation are known.

The other resin can be a polyester. Suitable polyesters include those comprising structural units of the formula

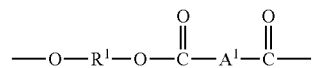

wherein each $R^1$ is independently a divalent aliphatic, alicyclic or aromatic hydrocarbon radical, or mixtures thereof and each $A^1$ is independently a divalent aliphatic, alicyclic or aromatic radical, or mixtures thereof. Examples of suitable polyesters are poly(alkylene dicarboxylate)s, liquid crystalline polyesters, polyarylates, and polyester copolymers such as copolyestercarbonates and polyesteramides. Also included are polyesters that have been treated with relatively low levels of diepoxy or multi-epoxy compounds. It is also possible to use branched polyesters in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make branched polyester. Furthermore, it is sometimes desirable to have various concentrations of acid and hydroxyl endgroups on the polyester, depending on the ultimate end-use of the composition.

In one embodiment at least some of the polyester comprises nucleophilic groups such as, for example, carboxylic acid groups. In some instances, it is desirable to reduce the number of carboxylic end groups, typically to less than 20 micro equivalents per gram of polyester, with the use of acid reactive species. In other instances, it is desirable that the polyester has a relatively high carboxylic end group concentration, in the range of 20 to 250 micro equivalents per gram of polyester or, more specifically, 30 to 100 micro equivalents per gram of polyester.

In one embodiment, the $R^1$ radical in formula (II) is a $C_{2-10}$ alkylene radical, a $C_{6-10}$ alicyclic radical or a $C_{6-20}$ aromatic radical in which the alkylene groups contain 2-6 and most often 2 or 4 carbon atoms. The $A^1$ radical in formula (II)

is most often p- or m-phenylene or a mixture thereof. This class of polyesters includes the poly(alkylene terephthalates), the poly(alkylene naphthalates) and the polyarylates. Exemplary poly(alkylene terephthalates) include linear aliphatic polyesters such as poly(ethylene terephthalate) (PET) and poly(butylene terephthalate) (PBT), as well as cyclic aliphatic polyesters such as poly(cyclohexanedimethanol terephthalate) (PCT). Exemplary poly(alkylene naphthalate)s include poly(butylene-2,6-naphthalate) (PBN) and poly(ethylene-2,6-naphthalate) (PEN). Other useful polyesters include poly(ethylene-co-cyclohexanedimethanol terephthalate) (PETG), polytrimethylene terephthalate (PTT), poly(dimethanol-1,4-cyclohexanedicarboxylate) (PCCD), and polyxylene terephthalate (PXT). Polyesters are known in the art as illustrated by the following U.S. Pat. Nos. 2,465,319, 2,720,502, 2,727,881, 2,822,348, 3,047,539, 3,671,487, 3,953,394, and 4,128,526.

Liquid crystalline polyesters having melting points less that 380° C. and comprising recurring units derived from aromatic diols, aliphatic or aromatic dicarboxylic acids, and aromatic hydroxy carboxylic acids are also useful. Examples of useful liquid crystalline polyesters include, but are not limited to, those described in U.S. Pat. Nos. 4,664,972 and 5,110,896. Mixtures of polyesters are also sometimes suitable.

The various polyesters can be distinguished by their corresponding glass transition temperatures ($T_g$) and melting points ($T_m$). The liquid crystalline polyesters generally have a $T_g$ and $T_m$ that are higher than the naphthalate-type polyesters. The naphthalate-type polyesters generally have a $T_g$ and $T_m$ that are higher than the terephthalate-type polyesters. Thus, the resultant poly(arylene ether) alloys with the liquid crystalline or naphthalate-type polyesters are typically better suited to applications requiring higher temperature resistance than are the terephthalate-type polyesters. The poly(arylene ether) alloys with terephthalate-type polyesters are generally easier to process due to the polyesters' lower $T_g$ values and $T_m$ values. Selection of the polyester or blend of polyesters utilized is therefore determined, in part, by the desired property profile required by the ultimate end-use application for the composition.

Because of the tendency of polyesters to undergo hydrolytic degradation at the high extrusion and molding temperatures in some embodiments the polyester is substantially free of water. The polyester may be predried before admixing with the other ingredients. Alternatively, the polyester can be used without predrying and the volatile materials can be removed by vacuum venting the extruder. The polyesters generally have number average molecular weights in the range of 15,000-100,000, as determined by gel permeation chromatography (GPC) at 30° C. in a 60:40 by weight mixture of phenol and 1,1,2,2-tetrachloroethane.

The other resin can be a polyolefin. Polyolefins include olefin homopolymers, such as polyethylene, polypropylene and polyisobutylene, as well as olefin copolymers. Exemplary homopolymers include polyethylene, high density polyethylene (HDPE), medium density polyethylene (MDPE), and isotactic polypropylene. Polyolefin resins of this general structure and methods for their preparation are well known in the art. Polyolefins typically have a density of about 0.91 to about 0.98 grams per centimeter$^3$.

The polyolefin may also be an olefin copolymer. Such copolymers include copolymers of ethylene and alpha olefins like octene, propylene and 4-methylpentene-1 as well as copolymers of ethylene and one or more rubbers and copolymers of propylene and one or more rubbers. Copolymers of ethylene and $C_3$-$C_{10}$ monoolefins and non-conjugated dienes, herein referred to as EPDM copolymers, are also suitable. Examples of suitable $C_3$-$C_{10}$ monoolefins for EPDM copolymers include propylene, 1-butene, 2-butene, 1-pentene, 2-pentene, 1-hexene, 2-hexene, 3-hexene, and the like. Suitable dienes include 1,4-hexadiene and monocylic and polycyclic dienes. Mole ratios of ethylene to other $C_3$-$C_{10}$ monoolefin monomers can be about 95:5 to about 5:95 with diene units being present in an amount of about 0.1 to about 10 mole percent. EPDM copolymers can be functionalized with an acyl group or electrophilic group for grafting onto a polyphenylene ether as disclosed in U.S. Pat. No. 5,258,455 to Laughner et al. Olefin copolymers further linear low density polyethylene (LLDPE).

The thermoplastic composition may comprise a single polyolefin homopolymer, a combination of polyolefin homopolymers, a single polyolefin copolymer, a combination of polyolefin copolymers, or a combination comprising a polyolefin homopolymer and a polyolefin copolymer.

In some embodiments the polyolefin is selected from the group consisting of polypropylene, high density polyethylene, and combinations of polypropylene and high density polyethylene. The polypropylene can be homopolypropylene or a polypropylene copolymer. Copolymers of polypropylene and rubber or block copolymers are sometimes referred to as impact modified polypropylene. Such copolymers are typically heterophasic and have sufficiently long sections of each component to have both amorphous and crystalline phases. Additionally the polypropylene may comprise a combination of homopolymer and copolymer, a combination of homopolymers having different melting temperatures, or a combination of homopolymers having different melt flow rates.

In some embodiments the polypropylene comprises a crystalline polypropylene such as isotactic polypropylene. Crystalline polypropylenes are defined as polypropylenes having a crystallinity content greater than or equal to 20%, more specifically greater than or equal to 25%, even more specifically greater than or equal to 30%. Crystallinity content may be determined by differential scanning calorimetry (DSC).

The high density polyethylene can be polyethylene homopolymer or a polyethylene copolymer. Additionally the high density polyethylene may comprise a combination of homopolymer and copolymer, a combination of homopolymers having different melting temperatures, or a combination of homopolymers having different melt flow rates and generally having a density of 0.941 to 0.965 g/cm$^3$.

The other resin can be a poly(arylene sulfide). Poly(arylene sulfide)s are a known class of polymers containing arylene groups separated by sulfur atoms. They include poly(phenylene sulfide)s, for example poly(p-phenylene sulfide), and substituted poly(phenylene sulfide)s. Typical poly(arylene ether)s comprise at least 70 mole percent, specifically at least 90 mole percent, more specifically at least 95 mole percent, of recurring para-phenylene sulfide units having the structure

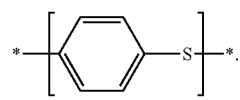

When the amount of said recurring units is less than 70 molar %, the heat resistance is somewhat limited. The remaining up to 30 mole percent of recurring units in the poly(arylene sulfide) can, in some embodiments, have a structure selected from

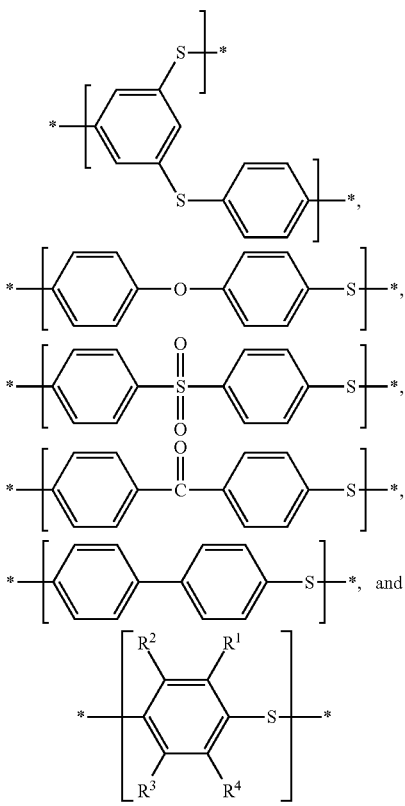

wherein $R^1$, $R^2$, W and $R^4$ are, independently at each occurrence, hydrogen, halogen, $C_1$-$C_{12}$ hydrocarbyl, $C_1$-$C_{12}$ hydrocarbyloxy, nitro, amino, carboxy, or the like.

The poly(arylene sulfide) can be a linear, branched, or cured polymer, or a mixture of at least two of the foregoing. Linear poly(arylene sulfide)s of relatively low molecular weight may be prepared by, for example, the process disclosed in U.S. Pat. No. 3,354,129 to Edmonds et al. Linear poly(arylene sulfide)s having a relatively high molecular weight may be prepared by, for example, the process disclosed in U.S. Pat. No. 3,919,177 to Campbell. Branched poly(arylene sulfide)s may be prepared by the use of a branching agent, for example, 1,3,5-trichlorobenzene, which is disclosed in U.S. Pat. No. 4,794,164 to Iwasaki et al. The degree of polymerization of the poly(arylene sulfide)s can be further increased by heating in an oxygen atmosphere or in the presence of a crosslinking agent such as, for example, a peroxide after polymerization.

The poly(arylene sulfide) can be functionalized or unfunctionalized. If the poly(arylene sulfide) is functionalized, the functional groups can include amino, carboxylic acid, metal carboxylate, disulfide, thiol, and metal thiolate groups. One method for incorporation of functional groups into poly(arylene sulfide) can be found in U.S. Pat. No. 4,769,424 to Takekoshi et al., which discloses incorporation of substituted thiophenols into halogen substituted poly(arylene sulfide)s. Another functionalizing method involves incorporation of chloro-substituted aromatic compounds containing the desired functionality reacted with an alkali metal sulfide and chloroaromatic compounds. A third functionalizing method involves reaction of poly(arylene sulfide) with a disulfide containing the desired functional groups, typically in the melt or in a suitable high boiling solvent such as chloronapthalene.

Though the melt viscosity of the poly(arylene sulfide) is not particularly limited, a melt viscosity of at least 100 Poise is preferred from the viewpoint of the toughness of the PPS and that of 10,000 Poise or less is preferred from the viewpoint of the moldability. In some embodiments, the poly(arylene sulfide) can have a melt flow rate less than or equal to 100 grams per 10 minutes measured at 316° C. and 5 kilogram load according to ASTM D1238-04c. Specifically, the melt flow rate can be 50 to 100 grams per 10 minutes.

The poly(arylene sulfide) can also be treated to remove unwanted contaminating ions by immersing the resin in deionized water or by treatment with an acid, typically hydrochloric acid, sulfuric acid, phosphoric acid, or acetic acid. For some product applications, it is preferred to have a very low impurity level, represented as the percent by weight ash remaining after burning a poly(arylene sulfide) sample. Typically the ash content is less than or equal to 1 weight percent, specifically less than or equal to 0.5 weight percent, more specifically less than or equal to 0.1 weight percent.

The thermoplastic composition can comprise the poly(arylene ether) in an amount of about 5 to about 95 weight percent, based on the total weight of the composition. Within this range, the poly(arylene ether) amount can be about 10 to about 90 weight percent, specifically about 20 to about 80 weight percent, more specifically about 20 to about 70 weight percent, even more specifically about 30 to about 60 weight percent, yet more specifically about 40 to about 60 weight percent. The melt flow benefits of the thermoplastic composition are most pronounced when the poly(arylene ether) amount is at least 20 weight percent. The thermoplastic composition can comprise the other resin in an amount of about 5 to about 95 weight percent, based on the total weight of the composition. Within this range, other resin amount can be about 10 to about 90 weight percent, specifically about 20 to about 80 weight percent, more specifically about 30 to about 70 weight percent, even more specifically about 40 to about 60 weight percent.

In addition to the poly(arylene ether) and the other resin, the thermoplastic composition can, optionally, further comprise a filler and/or reinforcing agent. The fillers and reinforcing agents can be in the form of nanoparticles, that is, particles with a median particle size ($D_{50}$) smaller than 100 nanometers as determined using light scattering methods. Useful fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as titanium dioxide, aluminum oxide, magnesium oxide, or the like; calcium sulfate (as its anhydride, dihydrate, or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; and combinations of the foregoing fillers and/or reinforcing agents. When present, the filler and/or reinforcing agent can be used in an amount of about 5 to about 20 weight percent, based on the total weight of the thermoplastic composition. Within this range, the filler and/or reinforcing agent amount can be about 10 to about 15 weight percent.

The thermoplastic composition can, optionally, further comprise a compatibilizer for the poly(arylene ether) and the other resin. Compatibilizers are particularly useful when the other resin is a polyamide, a polyester, or a polyolefin. Compatibilizers for blends of poly(arylene ether)s with these resins are known in the art. When present, the compatibilizer can be used in an amount of about 1 to about 20 weight percent, specifically about 3 to about 15 weight percent, more specifically about 5 to about 10 weight percent, based on the total weight of the thermoplastic composition.

The thermoplastic composition can, optionally, further comprise a flame retardant. A flame retardant is a chemical compound or mixture of chemical compounds capable of improving the flame retardancy of the thermoplastic composition. Suitable flame retardants include organophosphate esters, metal dialkyl phosphinates, nitrogen-containing flame retardants, metal hydroxides, and mixtures thereof.

In some embodiments, the flame retardant comprises an organophosphate ester. Exemplary organophosphate ester flame retardants include, but are not limited to, phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), and mixtures of two or more of the foregoing organophosphate esters.

In some embodiments the organophosphate ester comprises a bis-aryl phosphate having the formula

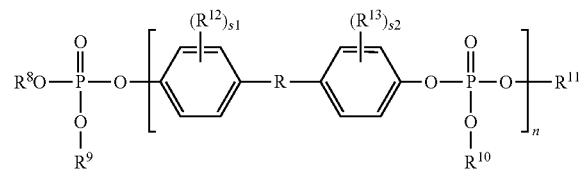

wherein R is independently at each occurrence a $C_1$-$C_{12}$ alkylene group; $R^{12}$ and $R^{13}$ are independently at each occurrence a $C_1$-$C_5$ alkyl group; $R^8$, $R^9$, and $R^{11}$ are independently a $C_1$-$C_{12}$ hydrocarbyl group; $R^{10}$ is independently at each occurrence a $C_1$-$C_{12}$ hydrocarbyl group; n is 1 to 25; and s1 and s2 are independently an integer equal to 0, 1, or 2. In some embodiments $OR^8$, $OR^9$, $OR^{10}$ and $OR^{11}$ are independently derived from phenol, a monoalkylphenol, a dialkylphenol or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl) propane, bis(4-hydroxyphenyl)methane, bis(4-hydroxy-3,5-dimethylphenyl)methane and 1,1-bis(4-hydroxyphenyl) ethane. In some embodiments, the bisphenol comprises bisphenol A.

In some embodiments, the flame retardant comprises a metal dialkyl phosphinate. As used herein, the term "metal dialkyl phosphinate" refers to a salt comprising at least one metal cation and at least one dialkyl phosphinate anion. In some embodiments, the metal dialkyl phosphinate has the formula

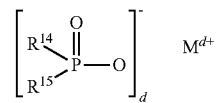

wherein $R^{14}$ and $R^{15}$ are each independently $C_1$-$C_6$ alkyl; M is calcium, magnesium, aluminum, or zinc; and d is 2 or 3. Examples of $R^{14}$ and $R^{15}$ include methyl, ethyl, n-propyl, isopropyl, n-butyl, tert-butyl, n-pentyl, and phenyl. In some embodiments, $R^{14}$ and $R^{15}$ are ethyl, M is aluminum, and d is 3 (that is, the metal dialkyl phosphinate is aluminum tris (diethyl phosphinate)).

In some embodiments, the metal dialkyl phosphinate is in particulate form. The metal dialkyl phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkyl phosphinate may be combined with a polymer, such as a poly(arylene ether), a polyolefin, a polyamide, a block copolymer, or combination thereof, to form a masterbatch. The metal dialkyl phosphinate masterbatch comprises the metal dialkyl phosphinate in an amount greater than is present in the thermoplastic composition. Employing a masterbatch for the addition of the metal dialkyl phosphinate to the other components of the thermoplastic composition can facilitate addition and improve distribution of the metal dialkyl phosphinate.

In some embodiments, the flame retardant comprises a nitrogen-containing flame retardant comprising a nitrogen-containing heterocyclic base and a phosphate or pyrophosphate or polyphosphate acid. In some embodiments, the nitrogen-containing flame retardant has the formula

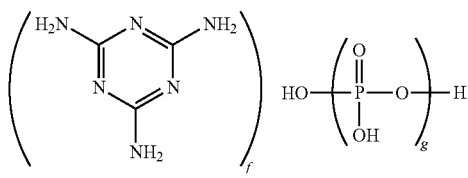

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2). In some embodiments, the nitrogen-containing flame retardant is melamine pyrophosphate, melamine polyphosphate, melamine cyanurate or a mixture thereof. In some embodiments in which the nitrogen-containing flame retardant is melamine polyphosphate, g has an average value of greater than 2 to 10,000, specifically 5 to 1,000, more specifically 10 to 500. In some embodiments in which the nitrogen-containing flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in International Patent Application No. WO 98/08898 A1 to Jacobson et al.

The nitrogen-containing flame retardant can have a low volatility. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame retardant comprises a metal hydroxide. Suitable metal hydroxides include all those capable of providing fire retardancy, as well as combinations of such metal hydroxides. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include, but are not limited to, magnesium hydroxide (for example, CAS Reg. No. 1309-42-8), aluminum hydroxide (for example, CAS Reg. No. 21645-51-2), cobalt hydroxide (for example, CAS Reg. No. 21041-93-0) and combinations of two or more of the foregoing. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be coated, for example, with stearic acid or other fatty acid.

In some embodiments, the flame retardant comprises melamine polyphosphate and magnesium hydroxide.

When present, the flame retardant is added to the thermoplastic composition in an amount of about 5 to about 25 weight percent of a flame retardant, based on the total weight of the thermoplastic composition. Within this range, the flame retardant amount can be about 10 to about 20 weight percent, specifically about 14 to about 18 weight percent. When the flame retardant comprises two or more components, these components can be used an any amount, provided that the total amount of flame retardant is in the range of about 5 to about 25 weight percent.

The thermoplastic composition can, optionally, further comprise additives known in the thermoplastics art. Such additives include, for example, stabilizers, mold release agents, processing aids, drip retardants, nucleating agents, ultraviolet blockers, dyes, pigments, antioxidants, anti-static agents, blowing agents, mineral oil, metal deactivators, anti-blocking agents, and the like, and combinations thereof. Amounts of additives, when present, are typically in the range of about 0.5 to about 5 weight percent, based on the total weight of the composition. Within this range, the amount can be about 1 to abut 4 weight percent, specifically about 2 to about 3 weight percent.

In a very specific embodiment, the poly(arylene ether) is a poly(2,6-dimethyl-1,4-phenylene ether) present in an amount of about 30 to about 70 weight percent; the poly(arylene ether) has a weight average molecular weight of about 45,000 to about 75,000 atomic mass units; the poly(arylene ether) has a peak molecular weight of about 20,000 to about 40,000 atomic mass units; the ratio of the weight average molecular weight to the peak molecular weight is about 1.5:1 to about 2.5:1; the poly(arylene ether) comprises about 0.1 to about 0.6 weight percent of morpholino groups; the other polymer comprises a rubber-modified polystyrene present in an amount of about 30 to about 70 weight percent; wherein all weight percents are based on the total weight of the thermoplastic composition; and wherein the thermoplastic composition exhibits a melt flow rate of about 10 to about 20 grams per 10 minutes measured at 280° C. and 5 kilogram load.

Another embodiment is a thermoplastic composition, comprising: a poly(arylene ether) characterized by a weight average molecular weight and a peak molecular weight, wherein a ratio of the weight average molecular weight to the peak molecular weight is about 1.3:1 to about 4:1; and an other polymer selected from the group consisting of polystyrenes, polyamides, polyolefins, poly(phenylene sulfide)s, and mixtures thereof. All of the limitations and embodiments discussed above in the context of the method of increasing the melt flow rate of a poly(arylene ether)-containing thermoplastic composition are applicable to the thermoplastic composition itself.

In a very specific embodiment of the thermoplastic composition, the poly(arylene ether) is a poly(2,6-dimethyl-1,4-phenylene ether) present in an amount of about 30 to about 70 weight percent; the poly(arylene ether) has a weight average molecular weight of about 45,000 to about 75,000 atomic mass units; the poly(arylene ether) has a peak molecular weight of about 20,000 to about 40,000 atomic mass units; the ratio of the weight average molecular weight to the peak molecular weight is about 1.5:1 to about 2.5:1; the poly(arylene ether) comprises about 0.1 to about 0.6 weight percent of morpholino groups; the other polymer comprises a rubber-modified polystyrene present in an amount of about 30 to about 70 weight percent; wherein all weight percents are based on the total weight of the thermoplastic composition; and wherein the thermoplastic composition exhibits a melt flow rate of about 10 to about 20 grams per 10 minutes measured at 280° C. and 5 kilogram load.

Another embodiment is a method of preparing a thermoplastic composition, comprising: melt blending
a poly(arylene ether) characterized by a weight average molecular weight and a peak molecular weight, wherein a ratio of the weight average molecular weight to the peak molecular weight is about 1.3:1 to about 4:1; and
an other polymer selected from the group consisting of styrenic polymers, polyamides, polyolefins, poly(phenylene sulfide)s, and mixtures thereof to form a thermoplastic composition. All of the limitations and embodiments discussed above in the context of the method of increasing the melt flow rate of a poly(arylene ether)-containing thermoplastic composition are applicable to the method of forming the thermoplastic composition.

In a very specific embodiment of the method of forming the thermoplastic composition, the poly(arylene ether) is a poly (2,6-dimethyl-1,4-phenylene ether) present in an amount of about 30 to about 70 weight percent; the poly(arylene ether) has a weight average molecular weight of about 45,000 to about 75,000 atomic mass units; the poly(arylene ether) has a peak molecular weight of about 20,000 to about 40,000 atomic mass units; the ratio of the weight average molecular weight to the peak molecular weight is about 1.5:1 to about 2.5:1; wherein the poly(arylene ether) comprises about 0.1 to about 0.6 weight percent of morpholino groups; the other polymer comprises a rubber-modified polystyrene present in an amount of about 30 to about 70 weight percent; wherein all weight percents are based on the total weight of the thermoplastic composition; and wherein the thermoplastic composition exhibits a melt flow rate of about 10 to about 20 grams per 10 minutes measured at 280° C. and 5 kilogram load.

The invention is further illustrated by the following non-limiting examples.

Characterization of Poly(Arylene Ether) Starting Materials

Four commercially available poly(2,6-dimethyl-1,4-phenylene ether)s were used in the blend examples below. Molecular weight characteristics of the three poly(2,6-dimethyl-1,4-phenylene ether)s were determined by gel permeation chromatography.

The first poly(2,6-dimethyl-1,4-phenylene ether) was obtained as PPO 646 from SABIC Innovative Plastics. The second poly(2,6-dimethyl-1,4-phenylene ether) was obtained as LXR48-52 from Bluestar New Chemical Materials Co., Ruicheng Branch, China. The third poly(2,6-dimethyl-1,4-phenylene ether) was obtained as LXR045 from Bluestar New Chemical Materials Co., Ruicheng Branch, China. The fourth poly(2,6-dimethyl-1,4-phenylene ether) was obtained as LXR040 from Bluestar New Chemical Materials Co., Ruicheng Branch, China.

Number average molecular weight and weight average molecular weight were determined by gel permeation chromatography as follows. The gel permeation chromatograph is calibrated using eight polystyrene standards, each of narrow molecular weight distribution, and collectively spanning a molecular weight range of 3,000 to 1,000,000 atomic mass units. The columns used were 1e3 and 1e5 angstrom PLgel columns with a 5 microliter 100 angstrom PLgel guard column. Chromatography was conducted at 25° C. The elution liquid was chloroform with 100 parts per million by weight di-n-butylamine. The elution flow was 1.2 milliliters per minute. The detector wavelengths were 254 nanometers (for polystyrene standards) and 280 nanometers (for poly(2,6-dimethyl-1,4-phenylene ether)). A third degree polynomial function is fitted through the calibration points. Poly(2,6-dimethyl-1,4-phenylene ether) samples are prepared by dissolving 0.27 grams poly(2,6-dimethyl-1,4-phenylene ether) solid in 45 milliliters toluene. A 50 microliter sample of the resulting solution is injected into the chromatograph. The peak molecular weight ($M_p$) corresponds to the highest peak in the molecular weight distribution. In statistical terms, this is the mode of the distribution. The values of peak molecular weight ($M_p$), number average molecular weight (MO, and weight average molecular weight ($M_w$) are calculated from the measured signal using the polystyrene calibration line. The $M_p$, $M_n$, and $M_w$ values are subsequently converted from polystyrene molecular weight to true poly(2,6-dimethyl-1,4-phenylene ether) molecular weights using the formula: $M(PPE)=0.3122 \times M(PS)^{1.073}$, where M(PPE) is the true poly (2,6-dimethyl-1,4-phenylene ether) molecular weight and M(PS) is the molecular weight based on polystyrene standards.

Molecular weight and intrinsic viscosity characteristics of the four poly(2,6-dimethyl-1,4-phenylene ether)s are summarized in Table 1, where "$M_p$ (AMU)" signifies the peak molecular weight expressed in atomic mass units; "$M_w$ (AMU)" signifies weight average molecular weight express in atomic mass units; "IV (dl/g) is the nominal intrinsic viscosity, expressed in deciliters per gram, as specified on the Certificate of Analysis accompanying the commercial product; "Fraction <50,000 (wt %)" is the weight percent of molecules in the sample having a molecular weight less than 50,000 atomic mass units; "Fraction 50,000-100,000 (wt %)" is the weight percent of molecules in the samples having a molecular weight of 50,000 to 100,000 atomic mass units; "Fraction 100,000-500,000 (wt %)" is the weight percent of molecules in the samples having a molecular weight of 100,000 to 500,000 atomic mass units"; and "Fraction >500,000 (wt %)" is the weight percent of molecules in the sample having a molecular weight greater than 500,000 atomic mass units. A comparison of molecular weight distribution curves for PPO 646 (dots) and LXR045 (bold dashes) is presented in the FIGURE.

The poly(arylene ether)s were analyzed by proton nuclear magnetic resonance spectroscopy ($^1$H NMR) to determine their content of bound morpholino

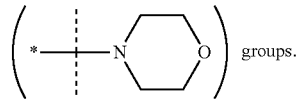

groups.

This method allowed determination of morpholino residues bound to internal and terminal phenylene ether residues within the poly(arylene ether). Result are presented in Table 1, where "Terminal morpholino (wt %)" is the weight percent of terminal morpholino groups based on the total weight of poly(arylene ether), "Internal morpholino (wt %)" is the weight percent of internal morpholino groups based on the total weight of poly(arylene ether), and "Total morpholino (wt %)" is the sum of terminal and internal morpholino groups.

TABLE 1

|  | PPO 646 | LXR48-52 | LXR045 | LXR040 |
|---|---|---|---|---|
| $M_p$ (AMU) | 50,000 | 50,000 | 30,000 | 30,000 |
| $M_w$ (AMU) | 62,700 | 84,100 | 62,000 | 51,600 |
| $M_w/M_p$ | 1.25 | 1.68 | 2.07 | 1.72 |
| IV (dl/g) | 0.46 | 0.5 | 0.46 | 0.41 |
| Fraction <50,000 (wt %) | 22.4 | 20.0 | 30.2 | 38.3 |
| Fraction 50,000-100,000 (wt %) | 25.5 | 19.3 | 16.7 | 25.4 |
| Fraction 100,000-500,000 (wt %) | 52.1 | 45.5 | 34.2 | 25.9 |
| Fraction >500,000 (wt %) | 0.0 | 15.4 | 18.8 | 10.4 |
| Terminal morpholino (wt %) | ND* | 0.23 | 0.20 | 0.19 |
| Internal morpholino (wt %) | ND | 0.15 | 0.08 | 0.06 |
| Total morpholino (wt %) | ND | 0.39 | 0.28 | 0.25 |

*ND = not detected

The commercially-obtained powder sample LX040 was further purified to form a purified sample by dissolving the dry powder in toluene at 25 weight percent solids, precipitating by mixing in 2 weight parts of methanol with 1 weight part of the 25 weight percent solution at ambient temperature, filtering the wet cake, reslurrying the wetcake in methanol (again, with 2 weight parts methanol), filtering again, and drying in a vacuum oven for 1 hour at 110° C. to obtain a purified sample of poly(2,6-dimethyl-1,4-phenylene ether). The characterization of the purified sample is summarized in Table 1-1. Molecular weight was determined by gel permeation chromatography (GPC) relative to polystyrene standards using UV detection at 280 nanometers wavelength. Molecular structure was determined by proton nuclear magnetic resonance spectroscopy ($^1$H NMR).

For characterization of the composition as a function of molecular weight fraction, fractions from six gel permeation chromatography injections (36 mg of total material injected) were collected using a Gilson fraction collector. The effluent eluting between 9 and 23 minutes run time was divided over 60 test tubes which were later recombined to give 6 fractions with each containing approximately 16.67% of the total poly(2,6-dimethyl-1,4-phenylene ether), as determined from area percent of the chromatogram. After evaporation of the fractions to approximately 15 milliliters under nitrogen flow, a small part (200 microliters) of the six fractions was analyzed by gel permeation chromatography to confirm the success of the fractionation. The remaining part was used for $^1$H NMR analysis. The portion used for NMR analysis was evaporated to dryness at 50° C. under a nitrogen flow. One milliliter of deuterated chloroform (with tetramethylsilane as internal standard) was added and the samples were analyzed by $^1$H NMR (512 scans). The results are also presented in Table 1-1.

Table 1-1 lists data for the purified whole sample and the six fractions derived from it. In the tables, "$M_n$" signifies number average molecular weight in units of atomic mass units (AMU); "$M_w$" signifies weight average molecular weight in units of AMU; "$M_p$" signifies the peak molecular weight, which is the molecular weight at the peak of the GPC chromatogram in units of AMU; "Monomodal?" signifies whether the molecular weight distribution from 250 to 1,000,000 AMU is monomodal (i.e., whether the plot of molar mass (x-axis) versus UV light absorbance ("W(logM)"; y-axis) has one and only one maximum point with a slope of zero); "Frac $M_n$/Bulk $M_n$," signifies, for a given fraction, the ratio of the fraction's number average molecular weight to the whole sample's number average molecular weight; "Frac $M_w$/Bulk $M_w$," signifies, for a given fraction, the ratio of the fraction's weight average molecular weight to the whole sample's weight average molecular weight; "wt % MW≧15×$M_n$" signifies the weight percent of the whole sample or fraction (depending on the row in Table 1-1) having a molecular weight greater than 15 times the number average molecular weight of the whole sample; "wt % MW≧5×$M_p$" signifies the weight percent of the whole sample or fraction having a molecular weight greater than five times the peak molecular weight of the whole sample; "wt % MW≧7×$M_p$" signifies the weight percent of the whole sample or fraction having a molecular weight greater than seven times the peak molecular weight of the whole sample. All of the above molecular weight characteristics are based on gel permeation chromatography analysis.

Data in the remaining rows of Table 1-1 are based on proton nuclear magnetic resonance ($^1$H NMR) analysis. "wt % Term. Morph" signifies weight of bound morpholine in the hydroxide-functionalized end of the poly(2,6-dimethyl-1,4-phenylene ether), expressed as weight percent of morpholino ($C_4H_8NO$) groups relative to the total weight of the poly(2,6-dimethyl-1,4-phenylene ether); "mol % Int. Morph" signifies the moles of internally-bound morpholino groups relative to the moles of poly(2,6-dimethyl-1,4-phenylene ether) chains; "mol % Term. Morph" signifies the moles of bound morpholine units in the hydroxide-functionalized end of the poly(2,6-dimethyl-1,4-phenylene ether) molecule relative to the moles of poly(2,6-dimethyl-1,4-phenylene ether) chains; "mol % Int. Biph" signifies the moles of internally bound 2,2',6,6'-tetramethyl-4,4'-biphenoxy units as percent of moles of poly(2,6-dimethyl-1,4-phenylene ether) chains; "Term./Int. Morph" signifies "mol % Term. Morph" divided by "mol % Int. Morph"; "Term6/Term1" signifies the "mol % Term. Morph" for fraction 6 divided by the mol % Term. Morph" for fraction 1 of the same sample.

The values of weight %, absolute molecular weight, and mol % obtained from $^1$H NMR were calculated as described in the equations below. The proton peak integrals on which the calculations are based are shown in the chemical structures below. Internal morpholine is based on the peak at 3.36 ppm for 2 protons (P1); terminal morpholine is based on the peak at 3.74 ppm for 4 protons (P2); internal biphenyl is based on the peak at 7.35 ppm for 4 protons (P3); PPE tail is based on the peak at 7.09 ppm for 3 protons (P4); PPE-OH head is based on the peak at 6.36 ppm for 2 protons (P5); and PPE repeat unit is based on the peak at 6.46 ppm for 2 protons (P6). Molecular weight values used in the calculations were 86 for

TABLE 1-1

| | Whole sample | Fraction 1 | Fraction 2 | Fraction 3 | Fraction 4 | Fraction 5 | Fraction 6 |
|---|---|---|---|---|---|---|---|
| Mn (AMU) | 19200 | 79800 | 52600 | 37400 | 25900 | 17200 | 5210 |
| Mw (AMU) | 52000 | 251200 | 69700 | 50000 | 35300 | 24900 | 13900 |
| Mp (AMU) | 38000 | 99900 | 67300 | 49600 | 34500 | 22200 | 12500 |
| Monomodal? | No | — | — | — | — | — | — |
| Frac Mn/Bulk Mn | 1 | 4.16 | 2.74 | 1.95 | 1.35 | 0.9 | 0.27 |
| Frac Mw/Bulk Mw | 1 | 4.83 | 1.34 | 0.96 | 0.68 | 0.48 | 0.27 |
| wt % MW ≧ 15 × Mn | 2.4 | 2.63 | 0.01 | 0 | 0.01 | 0.02 | 0.17 |
| wt % MW ≧ 5 × Mp | 3.4 | 14.44 | 0.14 | 0.03 | 0.04 | 0.12 | 1.26 |
| wt % MW ≧ 7 × Mp | 2.6 | 8.19 | 0.08 | 0.01 | 0.02 | 0.03 | 0.35 |
| wt % Term. Morph | 0.2 | 0.03 | 0.09 | 0.13 | 0.19 | 0.22 | 0.51 |
| Mol % Int. Morph | 6.5 | 35.6 | 19.9 | 10.6 | 7.3 | 3.2 | 2 |
| Mol % Term. Morph | 28.4 | 5.8 | 29.6 | 31.2 | 34.1 | 27.4 | 25.4 |
| Mol % Int. Biph | 3.8 | 47.1 | 5.5 | 4.4 | 4.7 | 2.7 | 2.3 |
| Term./Int. Morph | 4.39 | 0.16 | 1.49 | 2.93 | 4.67 | 8.48 | 12.84 |
| Term6/Term1 | 4.37 | — | — | — | — | — | — | internal and terminal morpholine ($C_4H_8NO$), 240 for 2,2',6,6'-tetramethyl-4,4'-biphenoxy ($C_{16}H_{16}O_2$), and 120 for PPE tail ($C_8H_9O$).

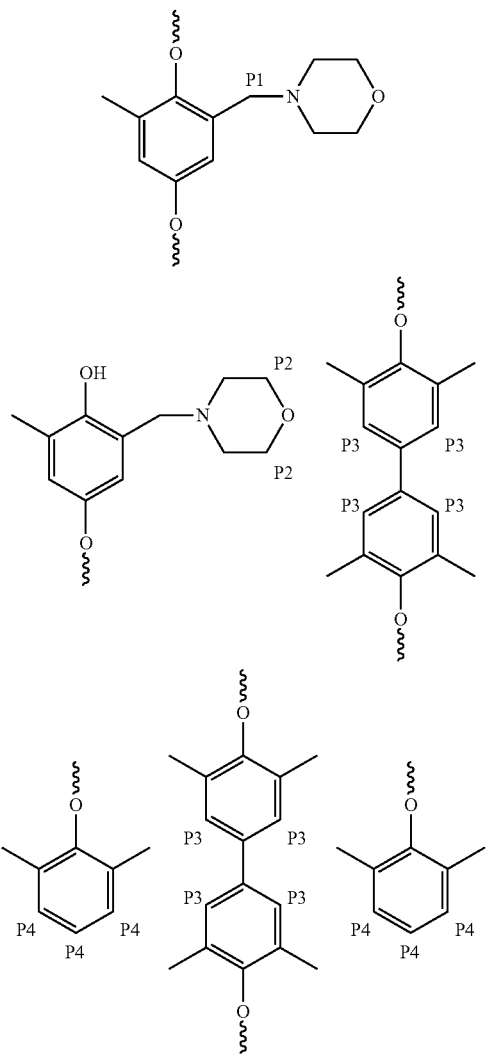

A general equation for calculating the weight percent of a functional group is given below as equation (1).

$$\frac{\text{Moiety Peak Integral}}{\text{PPE Repeat Unit Integral}} \times \frac{\textit{Mw} \text{ Moiety (see text)}}{\textit{Mw} \text{ PPE Repeat Unit (120)}} \times$$

$$\frac{\text{Number Equivalent Protons } \textit{PPE} \text{ (2)}}{\text{Number Equivalent Protons Moiety (see text)}} \times 100 =$$

$$\text{Wt. \% Moiety (to } \textit{PPE}\text{)}$$

An equation for calculating polymer molecular weight based on NMR integrals for internal and terminal groups is given below as equation (2).

$$\frac{\left(\begin{array}{c}((\textit{Int Biph} \text{ Integral})/4*2) + \\ (\textit{Int} \text{ Morph Integral}/2) + (\textit{PPE rep} \text{ unit Integral}/2)\end{array}\right)}{\left(\begin{array}{c}(((\textit{PPE-OH} \text{ Integral})/2) + (\textit{Ext} \text{ Morph Integral}/4) - \\ (\textit{PPE} \text{ Tail Integral}/3))*0.5 + (\textit{PPE} \text{ Tail Integral}/3)\end{array}\right)} \times 120 =$$

$$\text{Absolute Molecular Weight}$$

An equation for calculating the mole percent of a functional group is given below as equation (3).

$$\frac{\text{Moiety Peak Integral}}{\text{PPE Repeat Unit Integral}} \times$$

$$\frac{\text{Number Equivalent Protons } \textit{PPE} \text{ (2)}}{\text{Number Equivalent Protons Moiety (see text)}} \times$$

$$\frac{\text{Absolute Molecular Weight}}{120} \times 100 = \text{Mol. \% Moiety (to } \textit{PPE}\text{)}$$

Examples 1 and 2, Comparative Example 2

These examples illustrate the reduced melt viscosities exhibited by blends comprising a poly(arylene ether) having the specified ratio of weight average molecular weight to peak molecular weight.

Blends were prepared from the poly(arylene ether)s described above and the components summarized in Table 2.

TABLE 2

| Component Designation | Description |
|---|---|
| HIPS | High-impact polystyrene (rubber-modified polystyrene) having a polystyrene content of 88-91 weight percent and a polybutadiene content of 9-12 weight percent; obtained as Nova Empera 641F from NOVA Chemicals or HIPS 1897 from SABIC Innovative Plastics. |
| Mold release | Linear low density polyethylene (CAS Reg. No. 25087-34-7) obtained as ESCORENE LL5100.09 from ExxonMobil; or low density polyethylene (CAS Reg. No. 9002-88-4) obtained as STAMYLAN LD 1922 T from SABIC Innovative Plastics. |
| Antioxidant | Tridecyl phosphite (CAS Reg. No. 25448-25-3), obtained as TDP Weston from Chemtura. |
| Pigment | Carbon black (CAS Reg. No. 1333-86-4), obtained as VULCAN 9A32 from Cabot Corporation. |
| Stabilizer 1 | Zinc sulfide (CAS Reg. No. 1314-98-3), obtained as Sachtolith HD from Sachtleben. |
| Stabilizer 2 | Zinc oxide (CAS Reg. No. 1314-13-2), obtained as Zinc Oxide CR-4 from GH Chemical. |

Blend compositions are summarized in Table 3, where all component amounts are express in parts by weight.

Melt viscosities of the resin blends were measured at shear rates ranging from 100 to 10,000 reciprocal seconds at a temperature of 300° C. on a Kayeness Capillary Rheometer, Model LCR5000. Melt viscosity values are provided in Table 3. Example 2, which was formulated using a poly(arylene ether) having the same measured intrinsic viscosity as that used for Comparative Example 1, had a lower viscosity over the entire shear range. Example 1, made with a poly(arylene ether) having a higher intrinsic viscosity than the poly (arylene ether) used for Comparative Example 1, also displayed unexpectedly low melt viscosity; in fact it was nearly identical to that of Comparative Example 1.

Another measurement related to melt viscosity is Melt Flow Rate, or MFR. In this test, performed according to ASTM D1238-04c, resin is heated to a given temperature and allowed to thermally equilibrate. Then a fixed mass is applied, forcing the resin through a narrow capillary. The lower the melt viscosity of the resin is, the more material flows through the capillary in a fixed time. The results, expressed in units of grams per 10 minutes, are presented in Table 3. The temperature and mass used for this study were 280° C. and 5 kilograms. This test also demonstrated the unexpectedly low melt viscosity of Example 2 when compared to Comparative Example 1, which had an MFR value about two times higher. Example 1 was similar to Comparative Example 1; this result was also unexpected given the high measured intrinsic viscosity of the poly(arylene ether) used in Example 1.

Table 3 also includes results for a variety of physical properties. Tensile strength at yield, tensile elongation at break, and tensile modulus were measured at 23° C. according to ASTM D638-03 using Type I specimen and a testing speed of 50 millimeters/minutes. Flexural strength and flexural modulus were measured at 23° C. according to ASTM D790-07 using samples having a thickness of 0.25 inch (0.635 centimeter). Notched Izod impact strengths were measured at 23 and −30° C. using samples having a thickness of 0.125 inch (0.318 centimeter), and unnotched Izod impact strengths were measured at 23° C., using samples having a thickness of 0.125 inch (0.318 centimeter), all according to ASTM D256-06. Heat distortion temperatures were measured according to ASTM D648-07 using a sample thickness of 6.4 millimeters and a load of 1.82 megapascals. The results for Example 2 versus Comparative Example 1 show, surprisingly, that the increased melt flow of Example 2 did not come at the cost of diminished physical properties, as would normally be expected. Of the nine physical properties tested, seven were improved, one was unchanged, and one was diminished by less than one percent. It is especially surprising that tensile elongation was significantly improved.

The molecular weight distribution of the poly(arylene ether)s in the blends (that is, after compounding with the other resins) were determined by gel permeation chromatography using multi-wavelength detection to separate the contributions of the poly(arylene ether) and the polystyrene component of the HIPS. (The poly(arylene ether) was not isolated from the blend prior to analysis.) Weight fractions in various molecular weight ranges are presented in Table 3. Molecular weight distribution curves for Example 1 (bold solid curve) and Comparative Example 1 (light solid curve) are presented in the FIGURE, where they are overlaid with curves for the respective poly(arylene ether) starting materials. It can be seen that little change in poly(arylene ether) molecular weight distributions accompanies blending of the poly (arylene ether)s with other components.

TABLE 3

|  | C. Ex. 1 | Ex. 1 | Ex. 2 |
| --- | --- | --- | --- |
| COMPOSITIONS | | | |
| PPO 646 | 48.42 | 0 | 0 |
| LXR48-52 | 0 | 48.42 | 0 |
| LXR045 | 0 | 0 | 48.42 |
| HIPS | 48.42 | 48.42 | 48.42 |
| Mold release | 1.45 | 1.45 | 1.45 |
| Antioxidant | 0.97 | 0.97 | 0.97 |
| Pigment | 0.46 | 0.46 | 0.46 |
| Stabilizer 1 | 0.14 | 0.14 | 0.14 |
| Stabilizer 2 | 0.14 | 0.14 | 0.14 |
| PROPERTIES | | | |
| Viscosity at 100 $sec^{-1}$ (Pa-s) | 918 | 914 | 502 |
| Viscosity at 500 $sec^{-1}$ (Pa-s) | 390 | 399 | 258 |
| Viscosity at 1,000 $sec^{-1}$ (Pa-s) | 257 | 265 | 183 |
| Viscosity at 1,500 $sec^{-1}$ (Pa-s) | 199 | 205 | 147 |
| Viscosity at 3,000 $sec^{-1}$ (Pa-s) | 126 | 129 | 97.7 |
| Viscosity at 5,000 $sec^{-1}$ (Pa-s) | 90.0 | 90.0 | 70.7 |
| Viscosity at 10,000 $sec^{-1}$ (Pa-s) | 53.1 | 53.6 | 44.2 |
| MFR at 280° C., 5 kg (g/10 min) | 7.4 | 6.6 | 15.0 |
| Tensile strength at yield (MPa) | 58 | 58 | 59 |
| Tensile elongation at break (%) | 27 | 13 | 34 |
| Tensile modulus (MPa) | 2460 | 2430 | 2460 |
| Flexural strength (MPa) | 88 | 89 | 91 |
| Flexural modulus (MPa) | 2480 | 12520 | 2530 |
| Notched Izod, 23° C. (J/m) | 273 | 134 | 272 |
| Unnotched Izod, 23° C. (J/m) | 2050 | 970 | 2160 |
| Notched Izod, −30° C. (J/m) | 156 | 109 | 163 |
| HDT, 6.4 mm bar, 1.2 MPa load (° C.) | 126 | 127 | 127 |
| PPE Fraction <50,000 (wt %) | 20.0 | 19.5 | 33.9 |
| PPE Fraction 50,000-100,000 (wt %) | 23.4 | 19.8 | 20.0 |
| PPE Fraction 100,000-500,000 (wt %) | 55.9 | 50.5 | 40.5 |
| PPE Fraction >500,000 (wt %) | 0.6 | 10.2 | 5.6 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of increasing the melt flow rate of a poly(arylene ether)-containing thermoplastic composition, comprising:
melt blending
a poly(arylene ether) characterized by a weight average molecular weight and a peak molecular weight, wherein a ratio of the weight average molecular weight to the peak molecular weight is about 1.3:1 to about 4:1; wherein the poly(arylene ether) is a poly(2,6-dimethyl-1,4-phenylene ether); and wherein the poly(2,6-dimethyl-1,4-phenylene ether), after it is blended with the other resin, has a weight average molecular weight of about 75,000 to about 95,000 atomic mass units, a peak molecular weight of about 40,000 to about 60,000 atomic mass unit, a ratio of the weight average molecular weight to the peak molecular weight is about 1.6:1 to about 2.3:1, and a bimodal molecular weight distribution comprising a second local maximum having a second molecular weight of about 200,000 to about 400,000 atomic mass units; and
an other polymer consisting of one or more members selected from the group consisting of styrenic polymers, polyesters, polyolefins, and poly(phenylene sulfide)s
to form a thermoplastic composition.

2. The method of claim 1, wherein the poly(arylene ether) is the product of oxidative polymerization in the presence of a catalyst comprising copper ion and morpholine.

3. The method of claim 1, wherein the poly(arylene ether) comprises about 0.1 to about 0.6 weight percent of morpholino groups.

4. The method of claim 1, wherein the poly(arylene ether) is substantially free of di-n-butylamino groups.

5. The method of claim 1, wherein the thermoplastic composition comprises about 20 to about 70 weight percent of the poly(arylene ether) and about 20 to about 80 weight percent of the other polymer.

6. The method of claim 1, wherein the other polymer is a styrenic polymer.

7. The method of claim 1, wherein the other polymer comprises a polyamide.

8. The method of claim 1, wherein the other polymer comprises a polyester.

9. The method of claim 1, wherein the other polymer comprises a polyolefin.

10. The method of claim 1, wherein the other polymer comprises a poly(phenylene sulfide).

11. The method of claim 1,
wherein the poly(arylene ether) is present in an amount of about 30 to about 70 weight percent;
wherein the poly(arylene ether) comprises about 0.1 to about 0.6 weight percent of morpholino groups;
wherein the other polymer comprises a rubber-modified polystyrene present in an amount of about 30 to about 70 weight percent;
wherein all weight percents are based on the total weight of the thermoplastic composition; and
wherein the thermoplastic composition exhibits a melt flow rate of about 10 to about 20 grams per 10 minutes measured at 280° C. and 5 kilogram load.

12. A thermoplastic composition, comprising:
a poly(arylene ether) characterized by a weight average molecular weight and a peak molecular weight, wherein a ratio of the weight average molecular weight to the peak molecular weight is about 1.3:1 to about 4:1; wherein the poly(arylene ether) is a poly(2,6-dimethyl-1,4-phenylene ether); and wherein the poly(2,6-dimethyl-1,4-phenylene ether), before it is blended with the other resin, has a weight average molecular weight of about 75,000 to about 95,000 atomic mass units, a peak molecular weight of about 40,000 to about 60,000 atomic mass unit, a ratio of the weight average molecular weight to the peak molecular weight is about 1.6:1 to about 2.3:1, and a bimodal molecular weight distribution comprising a second local maximum having a second molecular weight of about 200,000 to about 400,000 atomic mass units; and
an other polymer selected from the group consisting of styrenic polymers, polyamides, polyolefins, poly(phenylene sulfide)s, and mixtures thereof.

13. A thermoplastic composition, comprising:
a poly(arylene ether) characterized by a weight average molecular weight and a peak molecular weight, wherein a ratio of the weight average molecular weight to the peak molecular weight is about 1.3:1 to about 4:1; wherein the poly(arylene ether) is a poly(2,6-dimethyl-1,4-phenylene ether); and wherein the poly(2,6-dimethyl-1,4-phenylene ether), after it is blended with the other resin, has a weight average molecular weight of about 75,000 to about 95,000 atomic mass units, a peak molecular weight of about 40,000 to about 60,000 atomic mass unit, a ratio of the weight average molecular weight to the peak molecular weight is about 1.6:1 to about 2.3:1, and a bimodal molecular weight distribution comprising a second local maximum having a second molecular weight of about 200,000 to about 400,000 atomic mass units; and
an other polymer selected from the group consisting of styrenic polymers, polyamides, polyolefins, poly(phenylene sulfide)s, and mixtures thereof.

14. A thermoplastic composition, comprising:
a poly(arylene ether) characterized by a weight average molecular weight and a peak molecular weight, wherein a ratio of the weight average molecular weight to the peak molecular weight is about 1.3:1 to about 4:1; wherein the poly(arylene ether) is a poly(2,6-dimethyl-1,4-phenylene ether); and wherein the poly(2,6-dimethyl-1,4-phenylene ether), after it is blended with the other resin, has a weight average molecular weight of about 75,000 to about 95,000 atomic mass units, a peak molecular weight of about 40,000 to about 60,000 atomic mass unit, a ratio of the weight average molecular weight to the peak molecular weight is about 1.6:1 to about 2.3:1, and a bimodal molecular weight distribution comprising a second local maximum having a second molecular weight of about 200,000 to about 400,000 atomic mass units; wherein the poly(arylene ether) comprises about 10 to about 20 weight percent of molecules having a molecular weight greater than 500,000 atomic mass units; and
an other polymer selected from the group consisting of styrenic polymers, polyamides, polyolefins, poly(phenylene sulfide)s, and mixtures thereof.

15. The thermoplastic composition of claim 13, wherein the poly(arylene ether) is the product of oxidative polymerization in the presence of a catalyst comprising copper ion and morpholine.

16. The thermoplastic composition of claim 13, wherein the poly(arylene ether) comprises about 0.1 to about 0.6 weight percent of morpholino groups.

17. The thermoplastic composition of claim 13, wherein the poly(arylene ether) is substantially free of di-n-butylamino groups.

18. The thermoplastic composition of claim 13, wherein the thermoplastic composition comprises about 20 to about 70 weight percent of the poly(arylene ether) and about 20 to about 80 weight percent of the other polymer.

19. The thermoplastic composition of claim 13, wherein the other polymer is a styrenic polymer.

20. The thermoplastic composition of claim 19, wherein the styrenic polymer comprises a homopolystyrene.

21. The thermoplastic composition of claim 19, wherein the styrenic polymer comprises a rubber-modified polystyrene.

22. The thermoplastic composition of claim 19, wherein the styrenic polymer comprises an unhydrogenated block copolymer of an alkenyl aromatic compound and a conjugated diene.

23. The thermoplastic composition of claim 19, wherein the styrenic polymer comprises a hydrogenated block copolymer of an alkenyl aromatic compound and a conjugated diene.

24. The thermoplastic composition of claim 13, wherein the other polymer comprises a polyamide.

25. The thermoplastic composition of claim 13, wherein the other polymer comprises a polyester.

26. The thermoplastic composition of claim 13, wherein the other polymer comprises a polyolefin.

27. The thermoplastic composition of claim 13, wherein the other polymer comprises a poly(phenylene sulfide).

28. The thermoplastic composition of claim 13,
wherein the poly(arylene ether) is present in an amount of about 30 to about 70 weight percent;
wherein the poly(arylene ether) comprises about 0.1 to about 0.6 weight percent of morpholino groups;
wherein the other polymer comprises a rubber-modified polystyrene present in an amount of about 30 to about 70 weight percent;
wherein all weight percents are based on the total weight of the thermoplastic composition; and
wherein the thermoplastic composition exhibits a melt flow rate of about 10 to about 20 grams per 10 minutes measured at 280° C. and 5 kilogram load.

29. An article comprising a thermoplastic composition of claim 13.

* * * * *